United States Patent Office 3,767,679
Patented Oct. 23, 1973

3,767,679
3-SUBSTITUTED CHROMONES
Maximillian von Strandtmann, Rockaway, Sylvester Klutchko, Hackettstown, and John Shavel, Jr., Mendham, N.J., assignors to Warner-Lambert Company, Morris Plains, N.J.
No Drawing. Filed Sept. 13, 1971, Ser. No. 180,073
Int. Cl. C07d 7/34
U.S. Cl. 260—345.2
12 Claims

ABSTRACT OF THE DISCLOSURE 3-substituted chromones having the following structural formulas are disclosed.

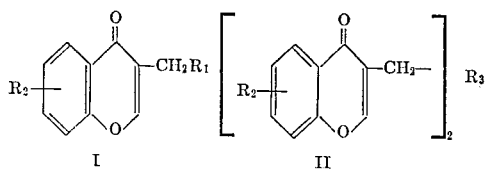

wherein $R_1$ is halogen, cyano, carboxy, carboxamido, amino, alkylamino, arylamino, alkoxy, N-alkylhydroxylamino, acyloxy, amido and imido; $R_2$ is hydrogen, halogen, lower alkoxy; and $R_3$ is amino, alkylenediamino such as ethylenediamino, etc., cyclic diamino such as piperazine-1,4-diyl,hydroxylamino, —O— or —S—. They are useful in preventing allergic manifestations.

Compounds of this type are prepared from 3-(hydroxymethyl)chromones.

The present invention relates to new and novel 3-substituted chromones having the following structural formulas:

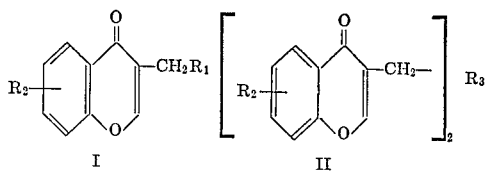

wherein $R_1$ is halogen, cyano, carboxy, carboxamido, amino, alkylamino, arylamino, alkoxy, N-alkylhydroxylamino, acyloxy, amido or imido; $R_2$ is hydrogen, halogen or lower alkoxy; and $R_3$ is amino, alkylenediamino, hydroxylamino, cyclic diamino, —O— or —S—.

In the above definitions for $R_1$, $R_2$ and $R_3$, the term "alkyl" and the "alkyl" portions in alkylamine and "alkoxy" are meant to contain from 1 to 7 carbon atoms; the term "acyl" is meant to be the residue derived from alkanoic acids of 1 to 7 carbon atoms and benzoic acid; the term "alkylene" in "alkylenediamine" is meant to contain from 2 to 7 carbon atoms and the term "cyclic diamino" is meant to include a 5- or 6-membered nitrogen containing heterocyclic rings such as piperidino, piperazino and the like.

The compounds of this invention are useful in alleviating allergic manifestations such as bronchial asthma. Thus, for example, when these compounds are tested in experimental animals such as rats in accordance with the procedures of Mota, Life Sciences, 7, 465 (1963); Ovary et al., Proc. Soc. Exptl. Biol. Med., 81, 584 (1952) they prevent allergic reactions at an intramuscular dose of 5 to 20 mg./kg.

In order to use these compounds to provide, for example, symptomatic relief of asthma a dose range of from 5 to 20 mg. per kilogram of body weight (1 to 3 times daily) is prescribed. This regimen can be varied by methods well known to the healing arts depending upon the severity of the allergic condition and the species of the animal being treated but is within the above range.

To administer these compounds orally they are formulated, for example, with diluents such as lactose, dicalcium phosphate into tablets or encapsulated in gelatin capsules.

To administer these compounds parenterally they are formulated with diluents such as peanut oil into an injector suitable for intramuscular administration.

The compounding of the above dosage forms are by known techniques for tableting and injection preparations by methods well known in the pharmacist's art.

According to the present invention, these 3-substituted chromones are prepared in accordance with the following reaction scheme.

Referring now to the scheme, it will be seen that compound A is the starting compound and it is treated in a variety of ways to give the compounds of this invention.

Thus, A is treated with an acid anhydride, for example, with acetic anhydride under reflux conditions to give those compounds of the invention where $R_1$ is acyloxy.

To obtain compound H, compound A is treated to remove $H_2O$ in an alcohol solvent. Typically, for example, A is treated with iodine in a mixture of methanol and acetone at room temperature. The resulting product is recovered by conventional procedure.

Compound B is obtained by treating A with thionyl chloride. Compound B is subsequently treated, for example, with potassium phthalimide to yield C. Compound C is then treated under acidic conditions to obtain compound D where $R_1$ is amino.

Compound B is further treated with a cyanide, e.g., potassium cyanide to yield the corresponding nitrile E which under acidic conditions yields compound F where $R_1$ is carboxamido and carboxy.

Compound B is also reacted with different types of amines to give other $R_1$ substituted compounds of this invention. Among the various amines which may be used are, for example, 1-methylpiperazine, piperazine, hydroxylamine, benzylamine, methylamine, amino pyridine, and the like.

Compound of type J is obtained by thermal dehydration at 260° C. of compound A.

The starting compound A is prepared in accordance with the procedure set forth in our copending application, Ser. No. 112,765, filed on Feb. 4, 1971, now abandoned.

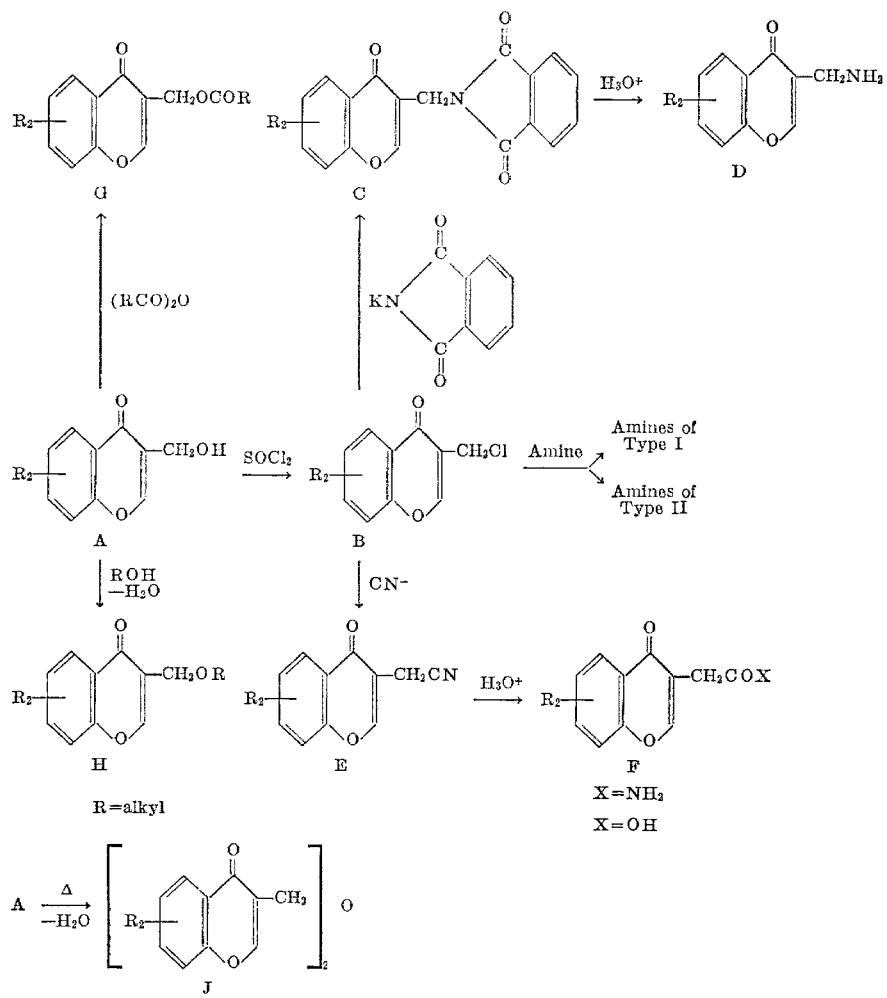

In order to further illustrate the practice of this invention the following examples are given:

EXAMPLE 1

3-(chloromethyl)chromone

Thionyl chloride, 119 g. (1.0 mol), was added over 5 minutes to a stirred mixture of 100 g. (0.568 mol) of 3-(hydroxymethyl)chromone and 800 ml. of benzene. Mild cooling was necessary to keep the temperature at 35° C. After 15 minutes at 35° C. the solution was warmed to distill off most of the excess thionyl chloride and benzene. Another 800 ml. of benzene was added and distilled to about 500 ml. volume when crystals began to separate. The cooled mixture was filtered to give 65 g. of product melting at 108–112° C. Upon addition of 500 ml. of petroleum ether to the filtrate a second crop of 17.0 g. was obtained, M.P. 109–113° C. Total weight was 82 g. (74%).

Recrystallization from ethyl acetate-petroleum ether gave pure material melting at 109–113° C.

Analysis for $C_{10}H_7ClO_2$ (percent): Calcd.: C, 61.72; H, 3.63; Cl, 18.22. Found: C, 61.80; H, 3.57; Cl, 18.15.

EXAMPLE 2

3-chromonylacetonitrile

A quantity of 15.0 g. (0.0764 mol) of 3-(chloromethyl)-chromone was added to a stirred mixture of 29.25 g. (0.45 mol) of potassium cyanide and 150 ml. of methanol. The reaction was mildly exothermic and the temperature was kept at 35° C. with mild cooling. After five minutes the mixture was diluted to one liter volume with ice water. The separated orange, tacky solid was filtered, washed well with water and dried. Weight 13.1 g. (92.7); M.P. 125°–129° C.

Recrystallization from ethyl acetate gave pure material melting at 137°–139° C. in 66% yield.

Analysis for $C_{11}H_7NO_2$ (percent): Calcd.: C, 71.35; H, 3.81; N, 7.56. Found: C, 71.35; H, 3.81; N, 7.39.

EXAMPLE 3

3-chromonylacetic acid

A mixture of 6.5 g. (0.035 mol) of 3-chromonylacetonitrile and 40 ml. of concentrated hydrochloric acid was heated with stirring on the steam bath (using condenser). All solid dissolved and after 5 minutes crystals separated. The mixture was heated for an additional 15 minutes when 100 ml. of water was added. The mixture was cooled, filtered, washed well with water and dried to give 6.0 g. (84%) of cream colored crystals melting at 218°–221° C.

Recrystallization from 2-propanol gave pure product melting at 220°–222° C.

Analysis for $C_{11}H_8O_4$ (percent): Calcd.: C, 64.71; H, 3.95; O, 31.34. Found: C, 64.89; H, 4.03; O, 30.98.

EXAMPLE 4

3-chromonylacetamide

A quantity of 5.0 g. (0.027 mol) of 3-chromonylacetonitrile was added to 50 ml. of concentrated hydrochloric acid at room temperature with stirring. Most of the solid dissolved after one half hour. The reaction was filtered through a sintered glass funnel to remove traces of undissolved and cold water (150 ml.) was added to the filtrate. The separated solid was filtered, washed well with water and dried. Weight 3.9 g. crude, M.P. 176°–184° C.

Purification was effected by dissolving the crude in 300 ml. hot absolute ethanol, filtering off undissolved solid, cooling in ice bath, filtering and drying. Weight 2.4 g. (43.8%), M.P. 201°–205° C.

Further recrystallization from absolute ethanol gave pure material melting at 210°–212° C.

Analysis for $C_{11}H_9NO_3$ (percent): Calcd.: C, 65.02; H, 4.46; N, 6.89. Found: C, 65.00; H, 4.61; N, 7.00.

EXAMPLE 5

3-[(4-methyl-1-piperazinyl)methyl]chromone

A quantity of 10.0 g. (0.051 mol) of 3-(chloromethyl)chromone was added gradually to 70 ml. of 1-methylpiperazine. The reaction was mildly exothermic as some solid separated. The stirred mixture was heated on the steam bath for one hour. Most of the excess base was removed on the rotary vacuum evaporator. Water (150 ml.) was added to the residue. Solid potassium carbonate was added to saturate and the separated oil was taken up into 500 ml. of ether. The ether solution was dried ($K_2CO_3$), charcoaled, filtered and concentrated. Xylene (150 ml.) was added and stripped-off at reduced pressure to "chase" the 1-methylpiperazine. This process was repeated. The viscous base was dissolved in 100 ml. of 2-propanol and the solution was treated with a moderate amount of hydrogen chloride. Ether (20 ml.) was added and crystals separated. Weight 8.5 g., M.P. 199°–201° C. On addition of additional ether to the filtrate 9.5 g. of a crop 2 was obtained, M.P. 228°–233° C. Crop No. 1 was recrystallized from absolute ethanol-ether to give 6.0 g. crystals, M.P. 204°–206° C. A test recrystallization did not raise the melting point. An elemental analysis showed this material to be slightly impure monohydrochloride.

To prepare the dihydrochloride, the above 6.0 g. was dissolved in 50 ml. of methanol and a large excess of hydrogen chloride was passed in. The crystals that separated from the warm solution were filtered, washed with methanol and then ether. Weight 6.0 g., M.P. 261–264° C. (dec.).

Recrystallization from methanol-ether gave pure dihydrochloride, M.P. 262°–265° C. (dec.).

Analysis for $C_{15}H_{18}N_2O_2 \cdot 2HCl$ (percent): Calcd.: C, 54.39; H, 6.09; N, 8.46; Cl, 21.41. Found (percent): C, 54.42; H, 6.08; N, 8.38; Cl, 21.25.

EXAMPLE 6

3-(phthalimidomethyl)chromone

A mixture of 9.7 g. (0.05 mol) of 3-(chloromethyl)chromone, 9.25 g. (0.05 mol) of potassium phthalimide and 20 ml. of dimethylformamide was heated at 90° C. with stirring for 10 minutes. The mixture was cooled to 50° C. and 100 ml. water was added. The separated solid was filtered, washed well with water, 2-propanol and then ether. Weight 14.3 g. (93.8%), M.P. 184°–186° C.

Recrystallization from dimethylformamide-water gave pure product melting at 184°–186° C.

Analysis for $C_{18}H_{11}NO_4$ (percent): Calcd.: C, 70.82; H, 3.63; N, 4.59. Found: C, 70.85; H, 3.63.; N, 4.67.

EXAMPLE 7

3,3'-(1,4-piperazinediyldimethylene)dichromone

A quantity of 7.0 g. (0.036 mol) of 3-(chloromethyl)chromone was added to a stirred mixture of 3.49 g. (0.018 mol) of piperazine hexahydrate and 100 ml. of methylene chloride. Potassium carbonate (20 g.) was added and the mixture was warmed on the steam bath. What appeared to be an exothermic reaction soon ensued. The reaction was removed from the heat as reflux was self-maintained for several minutes. The mixture was stirred for one hour. An additional 300 ml. of methylene chloride was added to help dissolve the sparingly soluble product. The mixture was filtered and the filter cake was washed with 200 ml. of methylene chloride. The methylene chloride filtrate was concentrated, the residue was triturated with 20 ml. of ether and the mixture was filtered. Weight 6.0 g. (82.8%), M.P. 111°–113° C.

Recrystallization from chloroform-ether gave pure pale yellow crystals melting at 112°–114° C.

Analysis for $C_{24}H_{22}N_2O_4$ (percent): Calcd.: C, 71.62; H, 5.51; N, 6.96. Found: C, 71.60; H, 5.51; N, 6.67.

EXAMPLE 8

3,3'-[(hydroxyamino)dimethylene]dichromone

A stirred mixture of 6.9 g. (0.1 mol) of hydroxylamine hydrochloride, 10 ml. of water, 150 ml. of methylene chloride and 9.73 g. (0.05 mol) of 3-(chloromethyl)chromone was treated with 20 g. potassium carbonate. The deep yellow-orange mixture was maintained at reflux for ½ hour. The methylene chloride was stripped off and 300 ml. of water was added to the aqueous carbonate mixture. Te separated solid was filtered, washed well with water and dried. Weight 5.0 g. (57.3%).

The hydrochloride salt was prepared by treating a suspension of the base in methanol with excess hydrogen chloride M.P. 195°–197° C.

Recrystallization from methanol-ether gave pure product, M.P. 196°–198° C. The chlorine in the elemental analysis was consistently low.

Analysis for $C_{20}H_{15}NO_5 \cdot HCl$ (percent): Calcd.: C, 62.26; H, 4.18; N, 3.63; Cl, 9.19. Found: C, 62.38; H, 4.26; N, 3.51; Cl, 7.46.

EXAMPLE 9

3-[(hydroxymethylamino)methyl]chromone

Chloroform (100 ml.) was added to a solution of 8.36 g. (0.1 mol) of N-methylhydroxylamine hydrochloride, obtained from Aldrich, in 50 ml. of water. Solid potassium carbonate was added to saturate aqueous layer. At room temperature with stirring, a solution of 9.8 g. (0.05 mol) of 3-(chloromethyl)chromone in 200 ml. of chloroform was added. The resulting yellow mixture was stirred for one hour and then heated at reflux for 15 minutes. The organic phase was separated, dried over potassium carbonate, filtered and concentrated to dryness. The tacky residue was slurried in 50 ml. of methanol and the mixture was treated with excess hydrogen chloride. Most of the solid went into solution. The solid was filtered and ether (150 ml.) was added to the filtrate to give 2.6 g. (16.7%) crystals melting at 186°–189° C.

Recrystallization from methanol-ether gave pure product, M.P. 186°–189° C.

Analysis for $C_{11}H_{11}NO_3 \cdot HCl$ (percent): Calcd.: C, 54.67; H, 5.01; N, 5.80. Found: C, 54.76; H, 4.99; N, 5.88.

EXAMPLE 10

3,3'-[(methylamino)dimethylene]dichromone

Monomethylamine gas was bubbled into a stirred solution of 10.0 g. (0.051 mol) of 3-(chloromethyl)chromone in 300 ml. of methylene chloride for 5 minutes. Methylamine hydrochloride separated. After ½ hour at room temperature the reaction mixture was warmed on the steam bath and additional monomethylamine was bubbled in for three minutes to complete the reaction. Water (50 ml.) and then solid potassium carbonate was added to saturate the aqueous phase. The organic layer was dried over $K_2CO_3$, filtered and concentrated to 20 ml. volume. Upon addition of 100 ml. of ether, 5.0 g. (56.8%) of the crude base was obtained.

The hydrochloride salt was prepared by treating a suspension of the base in methanol with hydrogen chloride gas, M.P. 233°–238° C.

Recrystallization from methanol-ether gave pure hydrochloride, M.P. 249°–251° C., existing as a hemimethanolate.

Analysis for $C_{21}H_{17}NO_4 \cdot HCl \cdot \frac{1}{2}CH_3OH$ (percent): Calcd.: C, 64.58; H, 5.04; N, 3.50; Cl, 8.87. Found: C, 64.52; H, 5.12; N, 3.40; Cl, 8.47.

EXAMPLE 11

3-[[(6-methyl-2-pyridyl)amino]methyl]chromone

A mixture of 7.6 g. (0.04 mol) of 3-(chloromethyl)-chromone and 32.4 g. (0.3 mol) of 2-amino-6-methylpyridine was fused at 130° C. for 5 minutes. Water (500 ml.) was added to the cooled reaction mixture. The separated oil crystallized. This was filtered, washed well with water and dried. Weight 10.7 g. (100%) M.P. 126°–129° C.

Recrystallization from methanol gave pure base, M.P. 135°–136° C.

The hydrochloride was prepared by treating a slurry of 5.7 g. of the base in 60 ml. of methanol with excess hydrogen chloride gas. Most of the base dissolved as the white salt separated. Weight 6.2 g., M.P. 262°–265° C.

Recrystallization from methanol-ether gave pure hydrochloride, M.P. 262°–265° C.

Analysis for $C_{16}H_{14}N_2O_2 \cdot HCl$ (percent): Calcd.: C, 63.47; H, 4.99; N, 9.25. Found: C, 63.34; H, 5.15; N, 9.25.

EXAMPLE 12

3-[(isopropylamino)methyl]chromone

A solution of 8.3 g. (0.0427 mol) of 3-(chloromethyl)-chromone in 50 ml. of methylene chloride was added over 5 minutes to refluxing isopropylamine (120.2 g.) with stirring. After 15 minutes at reflux, the reaction was stripped of excess amine and methylene chloride. Water (50 ml.) was added to the residue and then solid potassium carbonate was added to saturate. The separated orange oil was extracted into a solution of 150 ml. of benzene and 100 ml. of ether. The extract was dried ($K_2CO_3$), charcoaled, filtered and concentrated at atmospheric pressure. The residue was dissolved in 50 ml. of ether and treated with hydrogen chloride gas. The separated tacky yellow salt was dissolved in 100 ml. of hot 2-propanol. On addition of 100 ml. ether yellow crystals separated. Weight 5.0 g. (46.3%), M.P. 207°–209° C.

Recrystallization from ethanol-ether gave pure material, M.P. 209°–211° C.

Analysis for $C_{13}H_{15}NO_2 \cdot HCl$ (percent): Calcd.: C, 61.54; H, 6.36; N, 5.52. Found: C, 61.73; H, 6.33; N, 5.34.

EXAMPLE 13

3-(aminomethyl)chromone

A solution of 4.3 g. (0.014 mol) of 3-(phthalimido)-methyl)chromone, 50 ml. of glacial acetic acid and 50 ml. of concentrated hydrochloric acid was maintained at reflux for 6 hours. Most of the acetic acid and hydrochloric acid were stripped off at reduced pressure, water (150 ml.) was added and the phthalic acid was filtered. Potassium carbonate was added to the filtrate to neutralize and then to saturate. The tan, viscous, "salted out" material was separated from the supernatant and heated with 200 ml. of THF to mostly dissolve. Anhydrous potassium carbonate was added to dry the solution. The solution was charcoaled, filtered and treated with hydrogen chloride gas to precipitate a yellow viscous salt. Upon addition of 20 ml. of 2-propanol to the separated salt, solid developed. Ether (100 ml.) was added and the product was filtered. Weight 0.9 g. (30%), M.P. 187°–190° C.

Recrystallization from ethanol-ether gave constant, broad melting product, M.P. 192°–195° C. whose elemental analysis was slightly low in carbon.

Analysis for $C_{10}H_9NO_2 \cdot HCl$ (percent): Calcd.: C, 56.75; H, 4.76; N, 6.62. Found: C, 55.75; H, 5.12; N, 6.75.

EXAMPLE 14

3,3'-(oxydimethylene)dichromone

A quantity of 6.8 g. (0.0386 mol) of 3-hydroxymethyl)-chromone was fused, under nitrogen, at 260° C. for 5 minutes. The cooled melt was triturated with 50 ml. of water, filtered and washed well with water. The damp filter cake was dissolved in 30 ml. of hot tetrahydrofuran. The crystals that separated weighed 0.8 g. (12.4%) and melted at 192°–194° C.

Recrystallization from THF gave pure white product, M.P. 194°–196° C.

Analysis for $C_{20}H_{14}O_5$ (percent): Calcd.: C, 71.85, H, 4.22. Found C, 72.13, H, 4.24.

EXAMPLE 15

3-(methoxymethyl)chromone

A solution of 28.88 g. (0.164 mol) of 3-(hydroxymethyl)chromone, 30.0 g. (0.118 mol) of iodine, 100 ml. of methanol and 100 ml. of acetone was stirred at room temperature for three days. The reaction solution was poured into a stirred solution of 150 g. of sodium thiosulfate in 600 ml. of water. Sodium chloride was added to saturate the solution and the excess methanol and acetone were stripped off. The mixture was extracted with one liter of ether. The extract was dried over $K_2CO_3$, filtered and concentrated. The crude product was heated with 800 ml. of "Skellysolve B" to the boiling point and the hot supernatant was decanted, cooled, filtered (to remove small amount of crude starting material), charcoaled, filtered again and concentrated to give 20.5 g. of tacky, crude product.

Recrystallization from methanol-water gave 10.3 g. (33%) of good quality ether melting at 77°–79° C. Further recrystallization from "Skellysolve B" gave pure material melting at 77°–79° C.

Analysis for $C_{11}H_{10}O_3$ (percent): Calcd.: C, 69.46; H, 5.30. Found: C, 69.33; H, 5.19.

EXAMPLE 16

3-(hydroxymethyl)chromone acetate

A solution of 9.6 g. (0.052 mol) of 3-(hydroxymethyl)chromone in 50 ml. of acetic anhydride was heated at 110°–120° C. for 5 minutes. Water (200 ml.) was added and the warm mixture was stirred for one-half hour. The resulting solid was filtered, washed well with water and dried. Weight 6.5 g. (57.6%), M.P. 84°–86° C.

Recrystallization from ethylacetate-petroleum ether gave pure material melting at 85°–87° C.

Analysis for $C_{12}H_{10}O_4$ (percent): Calcd.: C, 66.05; H, 4.62. Found: C, 65.86; H, 4.48.

EXAMPLE 17

6-bromo-3-(hydroxymethyl)chromone acetate

A mixture of 5 g. of 6-bromo-3-(hydroxymethyl)chromone and 15 ml. of acetic anhydride was refluxed for 15 minutes. The solution was then poured onto 150 ml. of ice water and the solid precipitate was filtered off, washed with cold water and recrystallized from MeOH, M.P. 146°–148° C.; yield 4.5 g. (77%); $\lambda_{max.}$ m$\mu$ ($\epsilon$) 231 (31,500), 307 (5,650); $\nu_{max.}$ 755 (m.), 840 (m.), 1050 (m.), 1160 (ms.), 1245 (ms.), 1600 (m.), 1630 (ms.), 1725 (ms.)cm.$^{-1}$.

Analysis for $C_{12}H_9BrO_4$ (percent): Calcd.: C, 48.51; H, 3.05; Br, 26.89. Found: C, 48.79; H, 2.92; Br. 26.88.

EXAMPLE 18

6-bromo-3-(hydroxymethyl)chromone chloroacetate

A solution of 10 g. of 6-bromo-3-(hydroxymethyl)-chromone and 8.5 g. of chloracetic anhydride (J. T. Baker Chem. Co.) in 125 ml. of toluene was refluxed for 4 hours. The solution was then chilled, and the crystalline precipitate was filtered off, washed with cold toluene, and recrystallized from acetone, M.P. 126.5°–128.5° C.; yield 10.5 g. (81%); $\lambda_{max.}$ m$\mu$ ($\epsilon$) 231 (30,200), 307 (5,300); $\nu_{max.}$; 775 (m.), 805 (ms.), 960 (m.), 1155 (ms.), 1195 (ms.), 1630 (s.), 1730 (s.) cm.$^{-1}$.

Analysis for $C_{12}H_8BrClO_4$ (percent): Calcd.: C, 43.47; H, 2.43. Found: C, 43.72; H, 2.54.

We claim:
1. A compound of the formula:

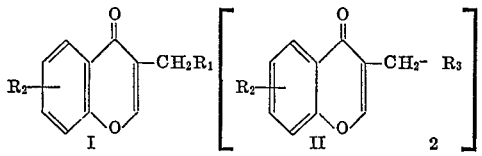

wherein $R_1$ is halogen, cyano, carboxy, carboxamido, amino, lower alkylamino, phenylamino, lower alkoxy, N-(hydroxy lower alkyl)amino, lower alkanoyloxy

and $R_2$ is hydrogen, halogen or lower alkoxy.

2. A compound according to claim 1 which is 3-(chloromethyl)chromone.
3. A compound according to claim 1 which is 3-chromonylacetonitrile.
4. A compound according to claim 1 which is 3-chromonylacetic acid.
5. A compound according to claim 1 which is 3-chromonylacetamide.
6. A compound according to claim 1 which is 3-[(hydroxymthylamino)methyl]chromone.
7. A compound according to claim 1 which is 3-[(isopropylamino)methyl]chromone.
8. A compound according to claim 1 which is 3-(aminomethyl)chromone.
9. A compound according to claim 1 which is 3-(methoxymethyl)chromone.
10. 3-(hydroxymethyl)chromone acetate.
11. 6-bromo-3-(hydroxymethyl)chromone acetate.
12. 6-bromo-3-(hydroxymethyl)chromone chloroacetate.

References Cited
UNITED STATES PATENTS
2,769,015  10/1956  Mentzer _____ 260—345.2

JOHN M. FORD, Primary Examiner

U.S. Cl. X.R.
260—345.5; 424—283; 260—268 BC, 326 A, 296 B